United States Patent
Gillis

(10) Patent No.: US 7,740,752 B2
(45) Date of Patent: Jun. 22, 2010

(54) FLUID REMEDIATION SYSTEM

(76) Inventor: Christopher S. Gillis, 75 E. Franklin St., Shavertown, PA (US) 18708

( * ) Notice: Subject to any disclaimer, the term of this patent is extended or adjusted under 35 U.S.C. 154(b) by 467 days.

(21) Appl. No.: 11/890,815

(22) Filed: Aug. 8, 2007

(65) Prior Publication Data
US 2008/0006566 A1 Jan. 10, 2008

Related U.S. Application Data

(63) Continuation-in-part of application No. 11/406,219, filed on Apr. 17, 2006, now abandoned.

(60) Provisional application No. 60/672,467, filed on Apr. 17, 2005.

(51) Int. Cl.
*B01D 21/24* (2006.01)

(52) U.S. Cl. .................. 210/85; 210/96.1; 210/206; 210/207; 210/218; 210/223; 210/259; 210/519; 210/521; 210/522; 210/532.1; 210/538; 210/540; 210/523

(58) Field of Classification Search .............. 210/85, 210/96.1, 141, 143, 198.1, 202–209, 257.1, 210/257.2, 258, 299–304, 264, 268, 335, 210/519–523, 743, 800–806, 608, 617, 709, 210/723, 724, 738, 218, 221.1, 221.2, 702, 210/703, 721, 222, 223, 259, 695, 532.1, 210/538, 540; 96/155, 182, 218, 219
See application file for complete search history.

(56) References Cited

U.S. PATENT DOCUMENTS

| | | | | |
|---|---|---|---|---|
| 2,118,157 A | * | 5/1938 | Camp | 210/800 |
| 2,342,024 A | * | 2/1944 | Walker | 210/703 |
| 2,757,797 A | * | 8/1956 | Eckert et al. | 210/703 |
| 2,948,677 A | * | 8/1960 | Austin et al. | 210/608 |
| 3,675,779 A | * | 7/1972 | Grutsch et al. | 210/242.2 |
| 3,940,337 A | * | 2/1976 | Robison | 210/197 |
| 3,963,624 A | * | 6/1976 | Henderson et al. | 210/521 |
| 4,049,553 A | * | 9/1977 | Stebbins et al. | 210/195.1 |
| 4,085,041 A | * | 4/1978 | Fullerton et al. | 210/608 |
| 4,151,084 A | * | 4/1979 | Probstein et al. | 210/97 |
| 4,482,459 A | * | 11/1984 | Shiver | 210/639 |
| 4,710,290 A | * | 12/1987 | Briltz | 210/199 |
| 4,855,061 A | * | 8/1989 | Martin | 210/709 |

(Continued)

*Primary Examiner*—Joseph W Drodge

(57) ABSTRACT

A system for separating suspended and dissolved materials in a fluid having a pH offset from neutral is disclosed. It employs a plurality of stacked, generally flat treatment beds each having a surface angled downward for receiving the fluid. Since the fluid is spread over a large surface, its velocity slows causing suspended materials to drop out of the fluid as a sludge. A pH correction device may add an agent to the flowing fluid which will bring the pH closer to neutral thereby causing said dissolved materials to precipitate out and into the sludge. Atmospheric oxygen may also be used to effect the precipitation. Portions of the beds may be isolated and the sludge collected resulting in a fluid having substantially less suspended and dissolved materials at a pH and temperature closer to normal. Energy may be produced from the movement of liquid through the system or from the heat energy of the fluid. Magnetics may be utilized to improve the precipitation of solids. The effluent discharge outlet may be connected to polishing ponds and/or to a water treatment facility. This invention is especially useful for remediating acid mine drainage.

25 Claims, 7 Drawing Sheets

U.S. PATENT DOCUMENTS 4,944,873 A * 7/1990 Williams .................... 210/209
5,326,474 A * 7/1994 Adams et al. ............... 210/519
5,589,064 A * 12/1996 Elmaleh .................... 210/206
5,779,908 A * 7/1998 Anderson et al. ........... 210/703
7,422,692 B1 * 9/2008 Sanders ..................... 210/709
2008/0006566 A1 * 1/2008 Gillis ........................ 210/96.1

* cited by examiner

FLUID REMEDIATION SYSTEM

CROSS-REFERENCE TO RELATED APPLICATIONS

This application is a continuation-in-part (CIP) of provisional U.S. Patent application "FLUID REMEDIATION SYSTEM" Ser. No. 60/672,467 filed Apr. 17, 2005 and U.S. patent application "FLUID REMEDIATION SYSTEM" Ser. No. 11/406,219 filed Apr. 17, 2006 now abandoned.

BACKGROUND OF THE INVENTION

1. Field of the Invention

This invention relates to a system for separating suspended and dissolved materials from an acidic fluid, while normalizing the pH of the fluid.

2. Discussion of Related Art

An ecosystem is a balanced relationship between the environment and the living organisms. The living organisms include fish, birds, amphibians, plants, water vegetation, algae and other aquatic life. These all depend upon the water to survive. The ecosystem requires water which is substantially free of pollutants. When water is changed from its natural state it kills or significantly reduces elements of the ecosystem. By significantly reducing the population of an element of a balanced ecosystem, the entire ecosystem can fail, and lead to a lifeless wasteland.

The water may be changed by: 1) offsetting the natural acidity/alkalinity (pH), 2) by introducing significant amounts of dissolved solutes, 3) by reducing the amount of dissolved oxygen, 4) by suspending large amounts of materials that were not originally intended to be in this ecosystem, and/or 5) by significantly changing the temperature of areas of the ecosystem.

Each of these may change the environment and disturb the ecosystem enough to significantly diminish the population of algae, fish, aquatic wildlife, amphibian wildlife, birds and terrestrial animals, and plants which use the water.

Changes in the routes of flowing water changes may be induced by natural causes, such as re-routing of a stream and ground water that begins flowing through underground passageways.

Water changes may be partially induced by human action in conjunction with natural events. This occurs when ground water passes through underground mines dug by humans.

Water changes may also be induced entirely created by human actions, such as when waste water from factories is introduced into streams.

Secondary Considerations

Changes to the ecosystem introduce secondary considerations. After killing off the natural wildlife, pollution will cause rivers, streams and lakes to become unpleasant, and reduce the value of the adjacent land. Remediation of the water affects the adjoining land such that the resulting increase in value may offset the cost remediation.

These changes typically discolor the water, make it unattractive for various water sports, thereby causing a substantial loss of the quality of life around these bodies of water.

Prior Attempts

Attempts have been made to remediate water in the past. One prior art method disperses water intended to be remediated into flat open fields. As the water velocity slows, sediment drops out of the water.

This method reduces the amount of suspended materials; however, this will not affect solutes or change the pH of the water. If the device is used to evaporate the water, the solutes are left behind; however, this does not produce clean water.

Another problem with this method is that the suspended materials and solutes that are extracted from the water are left in the low-lying evaporation field near the water source. If a flood occurs, these materials are washed back into the river.

This method requires a large amount of space to function, and is not an effective long-term solution.

Water Treatment Plants

Water treatment plants are effective at remediating water, and providing a large amount of clean water, however, they are very costly. These are designed to remove many types of impurities. In many applications, the nature and types of the impurities are well documented. Removal of the few types of impurities would produce substantially clean water, and treatment for all types of impurities would incur useless costs and a waste of resources.

Filtering

Filtering has been used to clean water. This is effective at removing suspended matter but does not affect dissolved solutes nor does it correct pH offset. Another problem is that filters must be replaced when they are full. Therefore treating large volumes of water can become costly and impractical.

Boiling/Distilling

Boiling or distilling water will remove all solutes, suspensions, and correct the pH, however the amount of energy required makes this economically unfeasible for large amounts of water.

Currently there is a need for a water remediation device which handles a large amount of water, is not costly and brings water back to its natural state.

SUMMARY OF THE INVENTION

One embodiment of the present invention is a system for separating suspended and dissolved materials in a fluid having a pH offset from neutral comprising:
  a) at least one generally flat treatment bed having a surface angled downward for receiving the fluid and causing it to flow over surface thereby reducing the velocity of the fluid thereby causing suspended materials to drop out of the fluid to create sludge on treatment bed surface;
  b) a pH correction device for adding a pH agent to the flowing fluid which will bring the pH closer to neutral thereby causing said dissolved materials to precipitate out of the fluid and add to the sludge on the treatment bed surface;
  c) an isolation device on the treatment bed capable of restricting fluid flow on at least a portion of the treatment bed surface;
  d) a sludge collection device for collecting the sludge on the treatment bed surface;
  e) a fluid outlet for allowing the fluid with less suspended and dissolved materials to exit the system.

Another embodiment of the present invention is a system for separating suspended and dissolved materials in a fluid having a pH offset from neutral comprising:
  a) a plurality of generally flat, stacked treatment beds, each having a surface angled downward for receiving the fluid and causing it to flow over surface thereby reducing the velocity of the fluid thereby causing suspended materials to drop out of the fluid to create sludge on treatment bed surface;
  b) pH correction device 400 for adding a pH agent to the flowing fluid which will bring the pH of the fluid closer to neutral thereby causing said dissolved materials to precipitate out of the fluid and add to the sludge on treatment bed surface;

c) an isolation device on the treatment bed capable of restricting fluid flow on at least a portion of the treatment bed surface;

d) a sludge collection device for collecting the sludge on the treatment bed surface;

e) a fluid outlet for allowing the fluid with less suspended and dissolved materials to exit system.

Yet another embodiment of the present invention is a system for separating suspended and dissolved materials in a fluid having a pH offset from neutral comprising:

a) a plurality of generally flat, stacked treatment beds, each having a surface angled downward for receiving the fluid and causing it to flow over surface thereby reducing the velocity of the fluid thereby causing suspended materials to drop out of the fluid to create sludge on treatment bed surface;

b) a system which will allow atmospheric oxygen to contact the acidic fluid which will bring the pH of the fluid closer to neutral thereby causing said dissolved materials to precipitate out of the fluid and add to the sludge on treatment bed surface;

c) an isolation device on the treatment bed capable of restricting fluid flow on at least a portion of the treatment bed surface;

d) a sludge collection system for collecting the sludge on the treatment bed surface and relocating from the structure;

e) an enclosed structure which will allow for the trapping of gasses released by the acidic fluid and the scrubbing of those gasses before they are released to the atmosphere;

f) an energy production system which utilizes waterwheel devices to produce electricity via the movement of fluid into, throughout, and exiting from the system;

g) a magnetic attraction device incorporated into the treatment bed system which uses magnetic forces to enhance separation of suspended and dissolved materials from the fluid;

h) a fluid outlet for allowing the fluid with less suspended and dissolved materials to exit system;

i) a settling basin or basins for allowing the fluid with less suspended and dissolved materials to further allow for more suspended materials to drop out of the fluid;

j) a conventional water treatment system to further improve the quality of the liquid for commercial or human consumption uses.

OBJECTS OF THE INVENTION

It is an object of the present invention to remediate large amounts of fluid to separate suspended and dissolved materials.

It is another object of the present invention to bring the pH level of a fluid to an acceptable level.

It is another object of the present invention to reduce temperature pollution in the environment.

It is another object of the present invention to reduce the level of greenhouse gasses in the environment.

It is another object of the present invention to realize energy from moving fluid.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

Even though the present invention is designed to separate suspended and dissolved material, correct pH, and normalize the temperature of various fluids, it will be described in the context of a specific example being that of a mediating acid mine drainage. It is to be understood that various other uses also fall within the scope of the present invention.

As discussed above there are many types and sources of water pollution. Take for example, acid mine drainage. Underground streams find their way into the abandoned mines which dissolve minerals as the water passes through the mines. The pH of the water is also changed so that it is slightly acidic. Many materials have solubility levels which differ along the pH scale. Therefore as the water becomes more acidic it has a greater ability to dissolve certain types of solutes.

Since a large volume of water is tunneled through fairly small channels of the mines, it picks up velocity and flows rapidly. The rapid flow picks up and carries suspended materials. Lighter materials with larger surface area are more easily carried than heavier materials with a smaller surface area. Also the size of the particle affects how it will be suspended. Larger particles tend to fall out faster and require a higher velocity to be carried by the water, whereas smaller particles can be carried in a relatively slow flowing stream.

Also, since the ground water is kept in a constant temperature year-round it artificially raises the temperature of the stream in the winter, and reduces the temperature of the stream in the summer. This is termed temperature pollution, and affects populations in the ecosystem.

As mentioned above, living organisms require oxygen dissolved in the water. The mine drainage has been underground for a while and has dissipated all but oxygen. As it exits the ground and enters the stream, one can visibly see the discoloration caused as the water becomes oxygenated. One can also visibly notice the lack of living organisms in the mine drainage.

As one can see, this makes the water very unattractive at this point and downstream.

This typically deters residential development. It also deters various industries from making use of the land in these areas.

Cleanup would be economically as well as aesthetically beneficial for a number of reasons. Therefore, the present invention was directed to remediate fluids as described below.

General Structure

Figure 1:
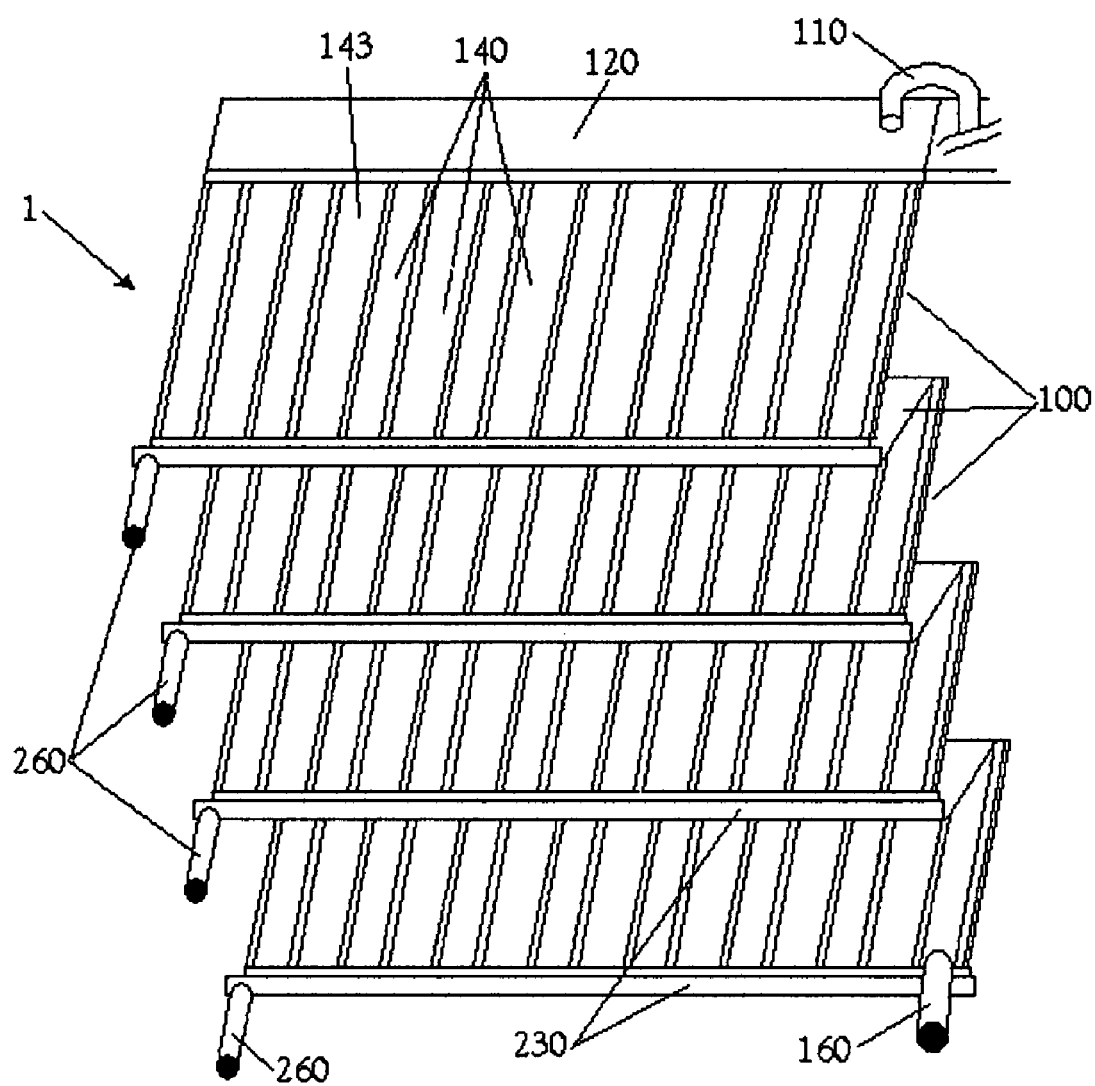
FIG. 1 is a perspective view of one embodiment of the present invention.
Figure 2:
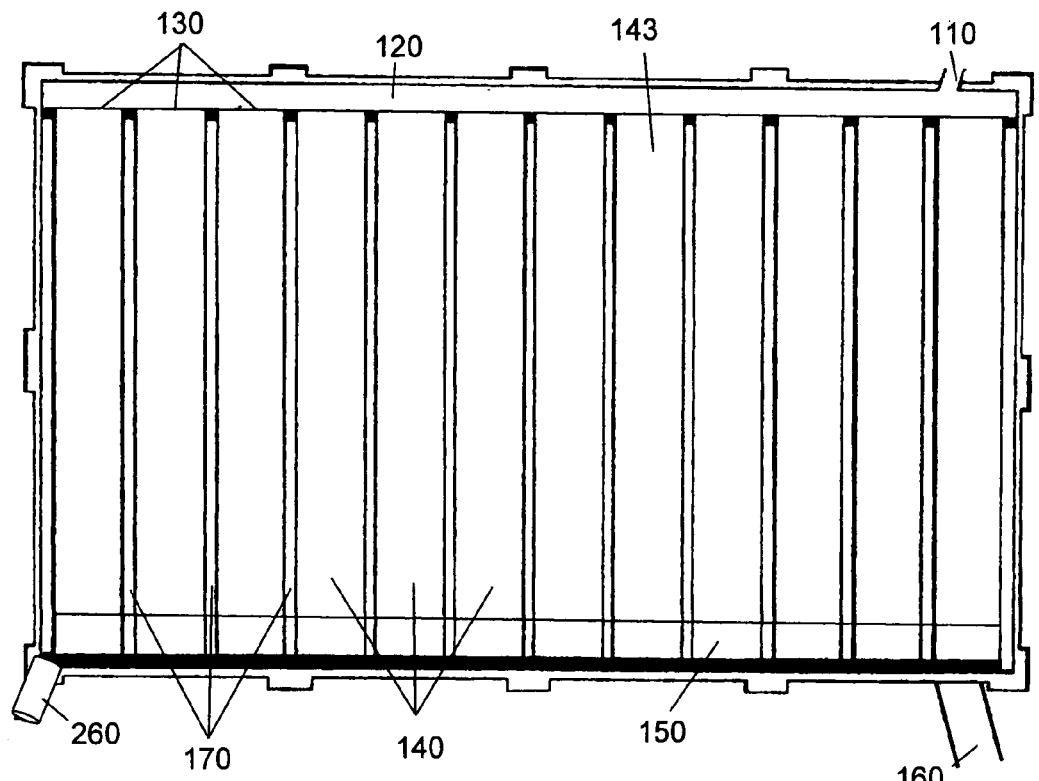
FIG. 2 is a plan view of the embodiment shown in FIG. 1.
Figure 3:
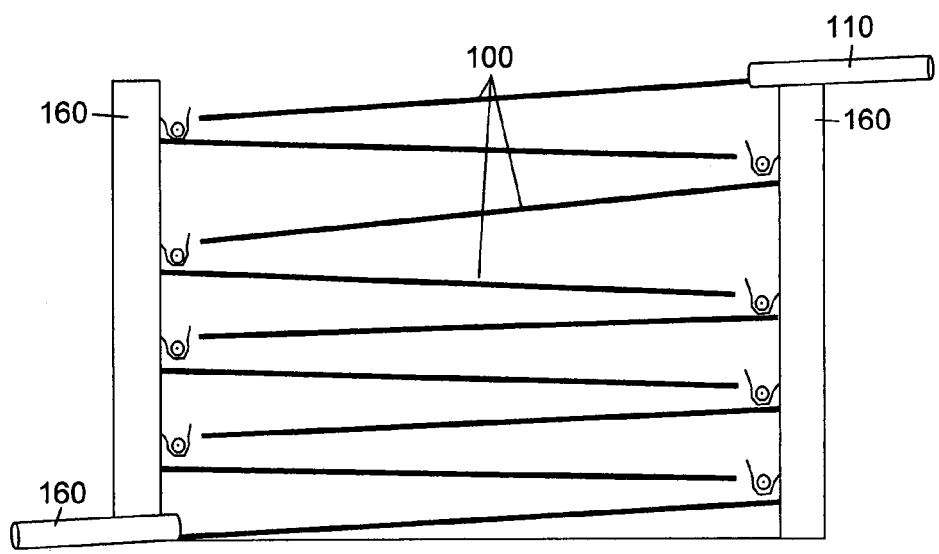
FIG. 3 is the side elevational view of the embodiment of the invention shown in FIGS. 1 and 2.

One embodiment of the present invention capable of meeting these goals is shown in FIGS. 1-3. FIG. 1 is a perspective view of one embodiment of the present invention. FIG. 2 is a plan view of the embodiment shown in FIG. 1. And FIG. 3 is the side elevational view of the embodiment of the invention shown in FIGS. 1 and 2. The present invention will be described in connection with FIGS. 1-3.

An acidic fluid having suspended and dissolved materials enters the system through inlet port 110. In this embodiment, a pump (not shown) may be used to force the fluid to the top of treatment system 1 if there is not enough existing fluid pressure.

The fluid passes through an inlet manifold 120 which evenly distributes the fluid over a surface 143 of treatment channels 140. By spreading the fluid over a large surface area, the velocity of the fluid substantially decreases thereby allowing suspended particles to drop out of the fluid.

Each treatment bed 100 is angled in a downward fashion allowing the fluid to flow downward to the end of each treatment bed 100. In order to save space, many of these treatment beds 100 may be stacked in an angled fashion such that fluid flowing to the lower end of an upper treatment bed falls onto the upper and of the next lower treatment bed 100. Treatment beds are stacked to minimize the footprint and to maximize treatment capability.

Therefore, the fluid zigzags downward through the system. This continues until the lowest treatment bed empties its fluid into collection manifold 150.

Channel surface 143 may employ a plurality of ridges or ribs 141 which trap the sludge and prevent it from washing out channel 140 and out of fluid outlet 160.

pH Correction

Figure 4:
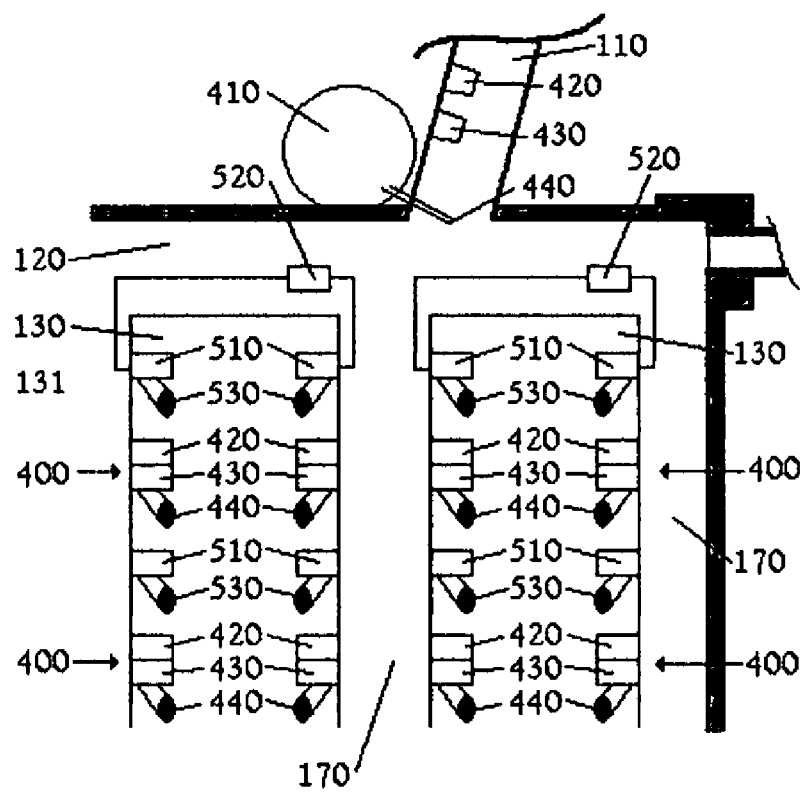
FIG. 4 is an enlarged view of one embodiment of pH correction device according to the present invention.

FIG. 4 is an enlarged view of one embodiment of pH correction device according to the present invention. In this example, the pH is below normal so that an alkaline material is added to raise the pH closer to an acceptable level. The present invention may also function to lower the pH in cases where the fluid is alkaline. Please note that the target pH will be what the natural or accepted pH of fluid should be. It does not necessarily mean that pH should be equal to 7.

In this example, a pH agent which may be acidic, basic, and/or a buffered solution as needed for the specific application, is stored in the pH agent tank 410. A sensing device 420 is located in the incoming fluid, tests the pH of the incoming fluid and the fluid flow. A calculation unit 430 coupled to sensing device 420 receives information regarding the incoming pH level of the fluid from sensing device 420. Calculation unit 430 has previously stored information regarding the concentration of pH agent and pH agent tank 410 and the location of the sensing device. It also is aware of the cross-sectional volume of the location where the sensing device is located. Calculation unit 430 uses this information to calculate the amount of fluid flow and the rate of flow of the pH agent required to result in a desired correction to the pH level at this point in the system.

Calculation unit 430 also controls agent injector 440 which injects a metered amount of pH agents into the flowing fluid.

In FIG. 4 a pH correction unit 400 is shown located near inlet 110 where the fluid enters the system. At this point there is a significant amount of flow and allows rapid mixing of pH agent for 410 with the incoming fluid. even though this arrangement enables rapid mixing of pH agent with the fluid, there can be significant precipitation of materials at this point.

Therefore in an alternate embodiment, the pH agent is introduced at the location that precipitation is desired. In this case pH correction units 400 are shown along either side of treatment channels 140. These may also be located at other locations inside of treatment channels 140. Since the pH in fluid flow rate has changes as the fluid flows through the system, various sensing devices 420 are located throughout system 1. In FIG. 4 one calculation unit 430 is shown for each pH correction unit 400. One or more calculation units 430 may be used provided that they are using pH levels and flow rates pertaining to the proper locations and are operating the proper agent injectors 440.

Agent injectors 440 are responsive to the calculation units 430 and inject the proper amount of pH agent from pH agent tank 410 into the fluid. In order to improve mixing, it is better if these injectors spray the pH agents over the largest possible volume. This would allow even mixing and cause the precipitates to be evenly distributed over treatment channels 140.

In an alternate embodiment, pH agent can be used as solid materials such as solid sodium hydroxide (NaOH) pellets in the case of increasing the pH levels, or anhydrous acids in the case of decreasing pH levels. Similarly, injectors 440 may employ apparatus used for moving and discharging solid materials.

At this point, most of the suspended materials have fallen out of the fluid into sludge in each of the treatment channels 140. Also, most of the dissolved materials have been precipitated out also falling into the sludge. The fluid at this point contains little or no suspended or dissolved materials, and is significantly closer to a desired pH level.

Sludge Collection

FIG. 4 shows inlet manifold 120 which employs channel isolation devices 130 which may be an adjustable weir 131, which function to allow or restrict flow to any of the channels 140. These effectively restrict fluid flow and close off one or more channels 140. These channels are closed off to allow collection of the sludge.

FIGS. 2 and 4 show a plurality of separators 170 between treatment channels 140. When a channel 140 is closed off, employees may walk down separators 140 with a high pressure hose washing the sludge downward to a collection trough 231 as shown in FIGS. 5 and 6.

Figure 5:
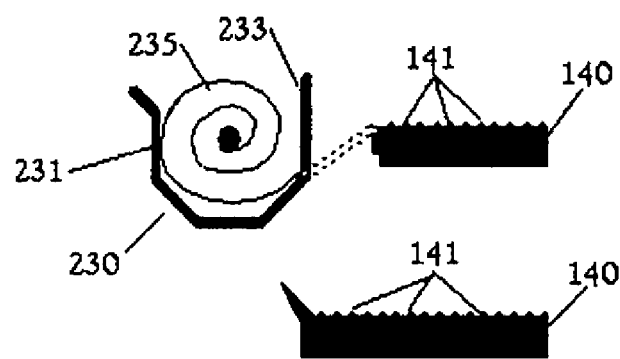
FIG. 5 is an enlarged side elevational view of one embodiment of a sludge collection device according to the present invention.

FIG. 5 is an enlarged side elevational view of one embodiment of a portion of sludge collection device 230 according to the present invention. It employs at least one diverter plate 233 which may be in an 'operating position' as shown in FIG. 5, or in a 'collection position' as shown in phantom in FIG. 5. When in the collection position, diverter plate 233 bridges the gap between collection trough 231 and treatment channels 140 allowing sludge to move down treatment channels 140 across diverter plate 233 and into collection trough 231.

Figure 6:
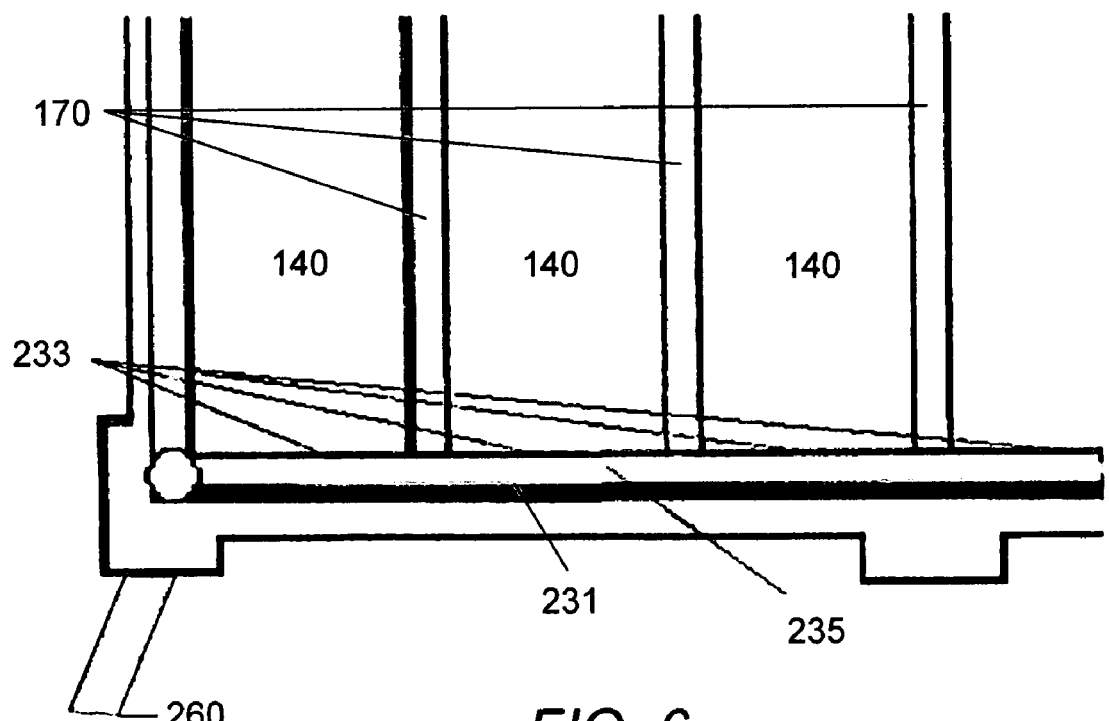
FIG. 6 is an enlarged view of a portion of the sludge collection device according to the present invention.

Referring now to FIG. 6, an enlarged view of the lower portion of the sludge collection device according to the present invention, it can be seen that collection trough 231 collects the sludge from the channels 140 and empties into a sludge outlet 260.

A sludge screw 235 or other sludge actuator carries the sludge along collection trough 231 to sludge outlet 260. The sludge is further processed to provide minerals and other raw materials for other uses.

Since the present invention is directed to remediation of large amounts of fluid it would be more efficient to automate the process. Therefore, FIG. 4 shows an automated embodiment for sludge collection.

Channels 140 employ a plurality of high-pressure jet nozzles 530 which fire a jet of fluid that pushes the sludge toward the middle of channel 140 and downward toward collection trough 231. Pressure is provided by a pump 520 which connects to jet nozzles 530. Jet nozzles 530 may be actuated by a jet control 510. Jet control 510 may also operate nozzles 530 in a synchronized manner to wash sludge down to collection trough 231.

In an alternative embodiment of the present invention, jet nozzles 530 may be mounted on tracks in, or near channel 140 which move from the top of treatment channels 140 to the bottom washing sludge downward into collection trough 231.

Other known mechanical means such as the use of mechanized squeegees which run down tracks in, or near channel 140 would also suffice to move sludge down channels 140 and into collection trough 231.

Figure 7:
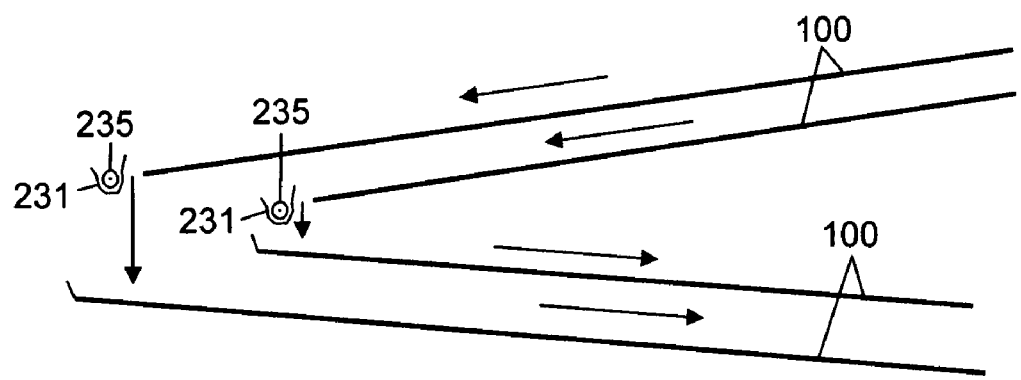
FIG. 7 is an enlarged side elevational view of a second embodiment of the present invention.

FIG. 7 is an enlarged side elevational view of another embodiment of the present invention. Multiple layers of treatment beds 100 may be used which are interleaved as shown. Many other configurations having angled treatment beds 100 are arranged in stacks may also be used, which are all within the scope of the present invention.

The sludge that is collected may be heated in ovens to remove residual moisture and to produce an anhydrous powder. In the case of acid mine drainage, a large percentage of this is iron oxide which may be used for manufacturing. There are also other valuable minerals such as manganese, magnesium, copper etc. which when sanitized, may be added to food products as mineral enhancement.

These valuable byproducts may be sold to offset the costs of remediation.

Of course, the most important product is the purified fluid.

ADDITIONAL EMBODIMENTS

Enclosed Structure

Figure 8:
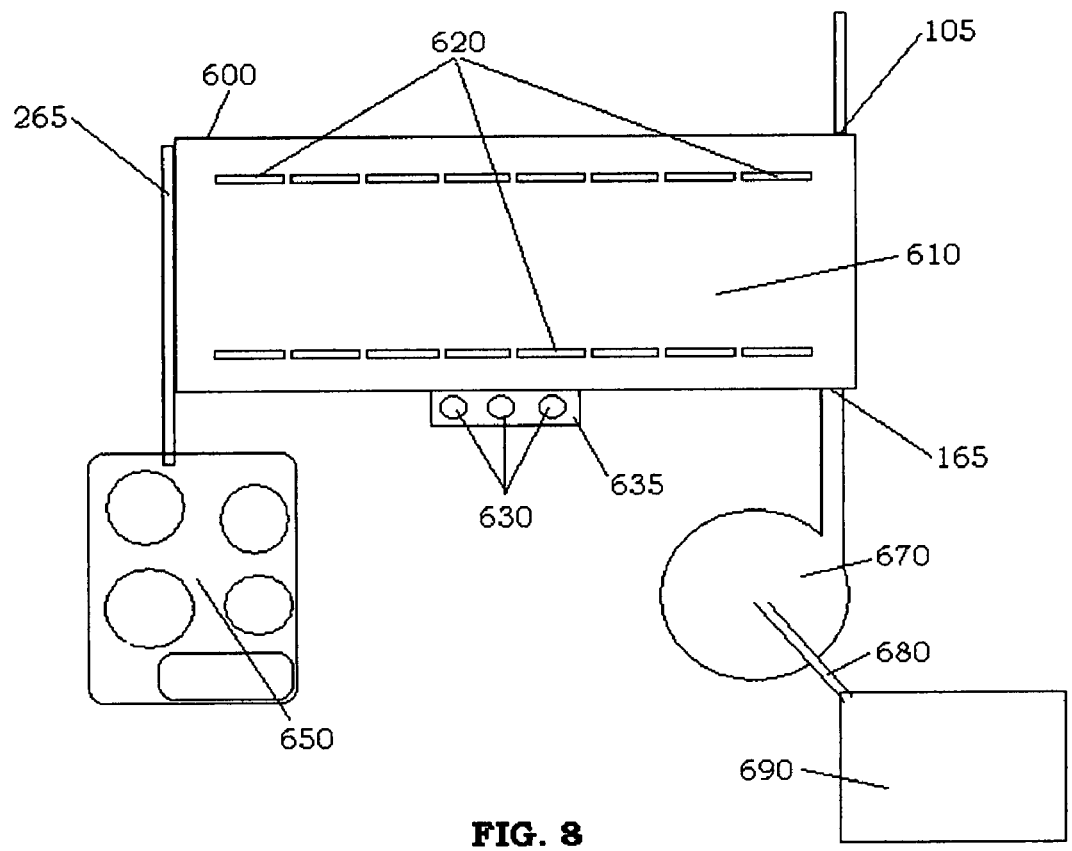
FIG. 8 is an overhead schematic view of a facility for treating AMD.

FIG. 8, shows a plan view one embodiment of a treatment facility which comprises a closed atmospheric system to capture gases which emanate from the acidic fluid as it passes through the system. This embodiment shows the acidic fluid inlet port 105 which transfers the acidic fluid from its source to the enclosed treatment facility 600. The enclosed roof 610 contains adjustable louvers 620 which can be opened or closed to allow for air intake or access to the interior of the structure for maintenance or other purposes.

Air movement within the structure may be natural or forced by the presence of fans 630 which collect the atmosphere from within the structure and convey it away from the structure for treatment or release into the environment or blow air into the facility for ventilation purposes. The gasses emanating from the acidic liquid as it flows through the system may thus be collected and passed through a treatment device 635 where the flow is scrubbed to remove them from the atmosphere.

The precipitated solids conveyor 265 transfers the precipitated material to a processing area 650 where it may be further dewatered and dried. The treated liquid outlet 165 conveys the treated liquid to a polishing pond 670 or multiple ponds where it may be retained or further treated before exiting through an outlet 680. The liquid may then be released into the environment or transferred to a conventional water processing facility 690 and retained for other uses.

Figure 9:
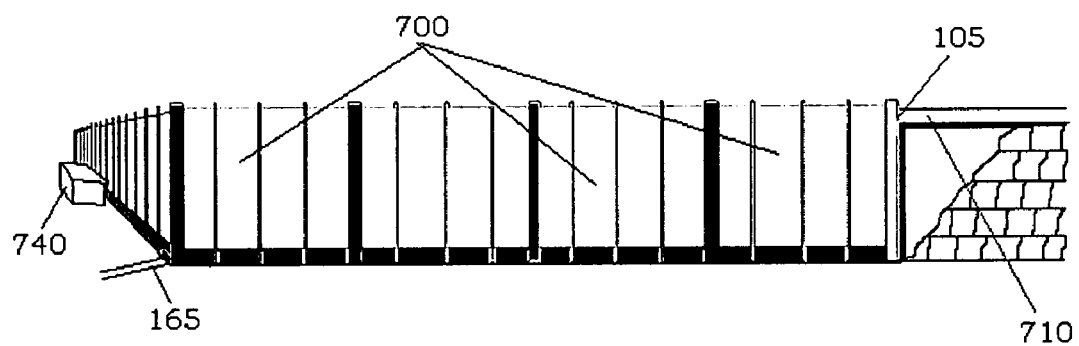
FIG. 9 is a side view showing the treatment facility.

FIG. 9 shows a right side view of the structure indicating enclosed walls 700. The acidic liquid conveyance 710 and the inlet 105 are also visible. The treated liquid outlet 165 is shown. The fan room 740 for the conveyance and treatment of the air within the facility is located adjacent to the treatment structure.

Energy Production

Figure 10:
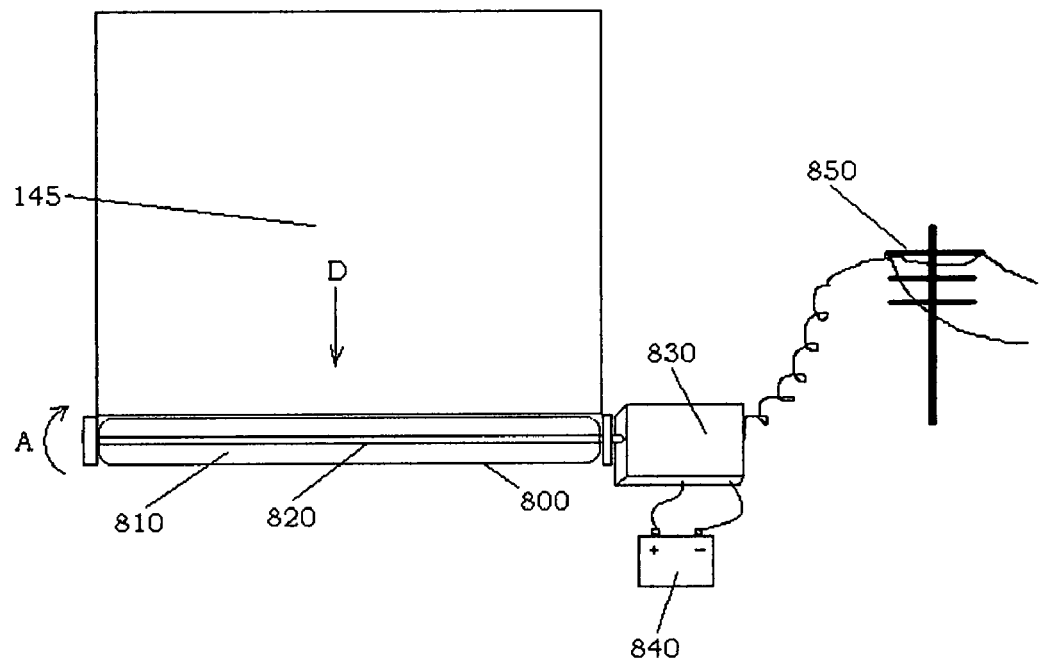
FIG. 10 is an overhead view showing a treatment plane with electric-generation waterwheel system.
Figure 11:
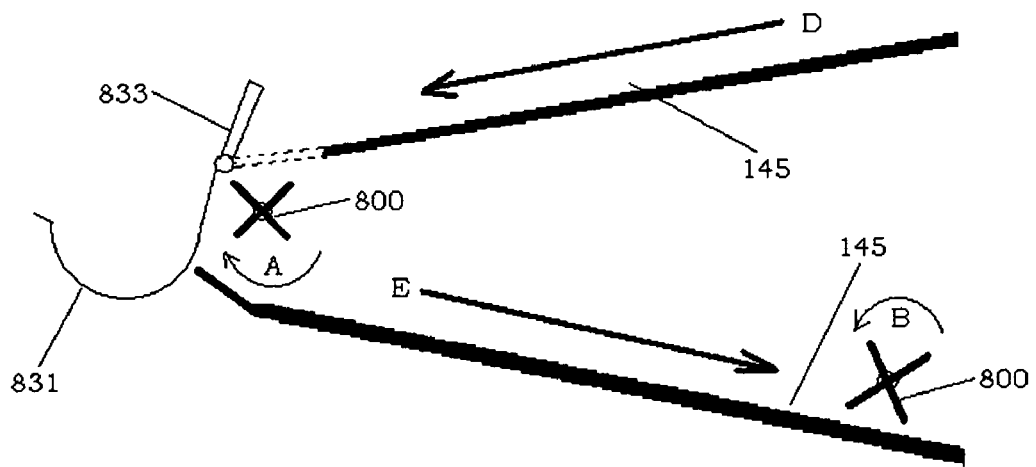
FIG. 11 is a side view of a schematic diagram showing possible water wheel location.

FIG. 10 shows an embodiment as a plan view of a device to produce energy extracted by the movement of liquid within the treatment structure. It shows a treatment bed 145 indicating the direction of flow of liquid by arrow "D". A waterwheel 800 with vanes 810 which may be flat or spiraled on a shaft 820 rotates in the direction of arrow "A". The shaft is connected to an electric generator 830 which produces electricity through the turning motion of the shaft. The generator may be connected to batteries 840 for storage or use, or indirectly through a power inverter to an electrical device or power grid 850. FIG. 11 shows a cross sectional side view of treatment beds 145 indicating the direction of liquid flow by arrows "D" and "E", respectively. The water wheels 800 are shown rotating in relation to the sludge diverter plate 833 and the sludge collection trough 831 by arrow "A", and in relation to the treatment bed 145 by arrow "B". Electrical generation waterwheels may be placed at any point in the system including at the inlet 105, along any treatment bed 145, and at the discharge outlet 165 indicated in FIGS. 9 & 10.

Heat energy which is contained within the acidic liquid and arises from the acidic liquid may also be used to warm or cool the facility or may be trapped within the enclosed structure, collected and conveyed to other facilities.

Magnetic Separation

Figure 12:
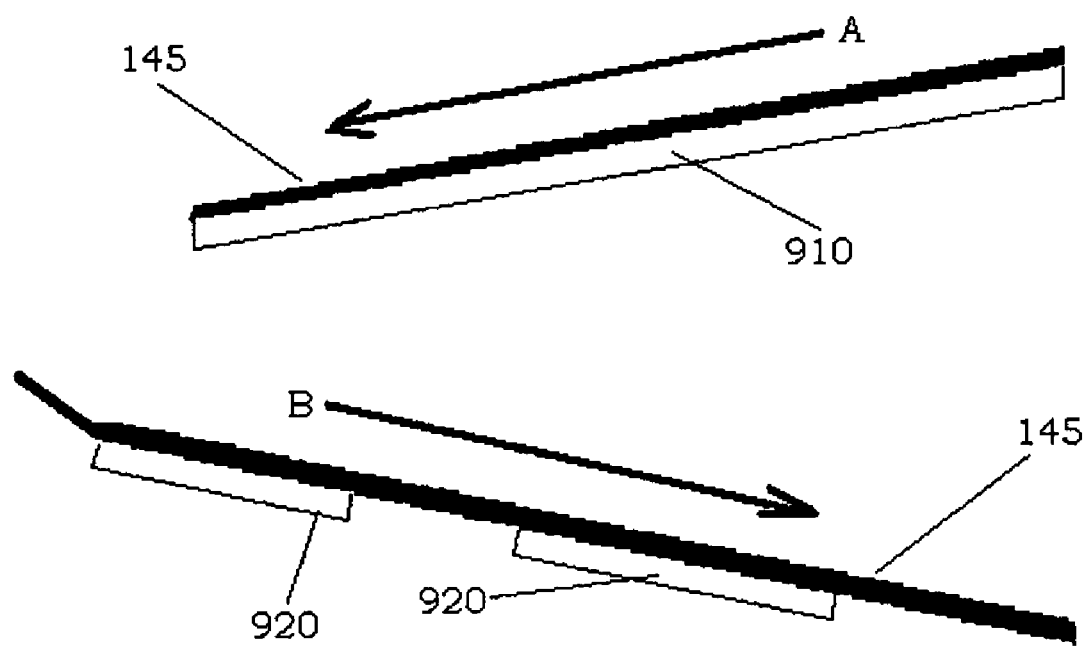
FIG. 12 is a side view of a schematic diagram showing placement of magnets below treatment planes.

FIG. 12 is a cross-sectional right side view of an embodiment of the invention which shows the use of permanent magnetic or electro-magnetic devices in conjunction with the system. A sheet of permanent magnetic material or an electromagnetic grid which may or may not be powered by the waterwheel may be placed beneath the entire length 910 of the treatment bed 145 which shows the movement of liquid by the arrows "A" and "B", respectively, or under selected sections 920 to enhance the precipitation of metals from the acidic liquid.

Having thus described the invention, what is desired to be protected by Letters Patent is presented in the subsequently appended claims.

What is claimed is:

1. A system for separating suspended and dissolved materials in a fluid comprising:
  a) at least one generally flat treatment bed each having a surface angled downward and comprising a plurality of treatment channels having ridges or ribs to trap the materials for receiving the fluid and causing it to flow over surface thereby reducing the velocity of the fluid thereby causing suspended materials to drop out of the fluid to create sludge on treatment bed surface;
  b) an inlet manifold at the upstream end of each treatment bed for providing fluid to the bed;
  c) isolation devices in the inlet manifold capable of restricting fluid flow on at least a portion of the treatment bed surface by selectively restricting flow to one or more of the channels from the inlet manifold;

d) a sludge collection device for collecting the sludge on the treatment bed surface;

e) a fluid outlet for allowing the fluid with less suspended and dissolved materials to exit the system.

2. The system of claim 1 further comprising adjustable vertical supports which adjust to provide different angle for at least one of the treatment beds to adjust velocity of the fluid flow.

3. The system of claim 1 further comprising a pH correction device for adding a pH agent to the flowing fluid which will bring the pH closer to neutral thereby causing said dissolved materials to precipitate out of the fluid and add to the sludge on the treatment bed surface.

4. The system of claim 3 wherein the pH correction device further comprises a pH sensor to determine the pH of the fluid.

5. The system of claim 4 wherein the pH correction addition device further comprises a calculation device connected to the pH sensor to read the pH of the fluid and to calculate a rate at which to add pH agent material.

6. The system of claim 5 wherein the pH correction device further comprises agent injectors which are responsive to calculation unit and inject the pH agent at the rate calculated by calculation unit.

7. The system of claim 1 wherein the isolation device comprises at least one adjustable weir.

8. The system of claim 1 wherein the sludge collection device comprises:

a) a collection receptacle spaced away from a lower edge of treatment bed capable of receiving and holding sludge; and b) a diverter plate capable of being in a collection mode, or an operating mode, in the collection mode it connects at least one treatment bed to the collection receptacle thereby causing a bridge from the collection receptacle to treatment bed allowing collection receptacle to receive materials sliding off of treatment bed, in the operating mode, it does not connect to treatment bed.

9. The system of claim 8 wherein collection receptacle further comprises a sludge screw for moving materials collected in the collection receptacle along the length of collection receptacle and out a sludge outlet.

10. A system for separating suspended and dissolved materials in a fluid comprising:

a) a plurality of generally flat, stacked treatment beds, each having a surface angled downward and comprising a plurality of treatment channels having ridges or ribs to trap the materials for receiving the fluid and causing it to flow over the surface thereby reducing the velocity of the fluid thereby causing suspended materials to drop out of the fluid to create sludge on treatment bed surface;

b) an inlet manifold at the upstream end of each treatment bed for providing fluid to the bed;

c) isolation devices in the inlet manifold capable of restricting fluid flow on at least a portion of the treatment bed surface by selectively restricting flow to one or more of the channels from the inlet manifold;

d) a sludge collection device for collecting the sludge on the treatment bed surface;

e) a fluid outlet for allowing the fluid with less suspended and dissolved materials to exit system.

11. The system of claim 10 wherein the plurality of treatment beds are connected serially and stacked in vertical layers.

12. The system of claim 10 further comprising adjustable vertical supports which adjust to provide different angle for at least one of the treatment beds to adjust velocity of the fluid flow.

13. The system of claim 10 further comprising a pH correction device for adding a pH agent to the flowing fluid which will bring the pH closer to neutral thereby causing said dissolved materials to precipitate out of the fluid and add to the sludge on the treatment bed surface.

14. The system of claim 13 wherein the pH correction device further comprises a pH sensor to determine the pH of the fluid.

15. The system of claim 14 wherein the pH correction device further comprises a calculation device connected to the pH sensor to read the pH of the fluid and calculates a rate at which to add a pH agent.

16. The system of claim 15 wherein the pH correction device further comprises agent injectors which are responsive to calculation unit and inject the pH agent at the rate calculated by calculation unit.

17. The system of claim 10 wherein the isolation device comprises at least one adjustable weir.

18. The system of claim 10 wherein the sludge collection device comprises:

a) collection receptacle spaced away from a lower edge of treatment bed capable of receiving and holding sludge; and b) a diverter plate capable of being in an operating mode or a collection mode, in the operating mode, it does not connect to treatment bed, whereas in the collection mode it connects between the treatment bed and the collection receptacle thereby causing a bridge from the collection receptacle to treatment bed allowing collection receptacle to receive materials sliding off of treatment bed.

19. The system of claim 18 wherein collection receptacle further comprises a sludge screw for moving materials collected in the collection receptacle along the length of collection receptacle and out a sludge outlet.

20. A system for separating suspended and dissolved materials in a fluid comprising:

a) one or more generally flat, stacked treatment beds, each having a surface angled downward and comprising a plurality of treatment channels having ridges or ribs to trap the materials for receiving the fluid and causing it to flow over the surface thereby reducing the velocity of the fluid thereby causing suspended materials to drop out of the fluid to create sludge on treatment bed surface;

b) structure which will allow atmospheric oxygen to contact the fluid thereby causing said dissolved materials to precipitate out of the fluid and add to the sludge on treatment bed surface and configured for maintaining a controlled atmosphere in the system by providing for air exchange and circulation and also air ventilation, treatment or scrubbing;

c) an inlet manifold at the upstream end of each treatment bed for providing fluid to the bed isolation devices in the inlet manifolds capable of restricting fluid flow on at least a portion of the treatment bed surface by selectively restricting flow to one or more of the channels from the inlet manifold;

d) a sludge collection device for collecting the sludge on the treatment bed surface;

e) a fluid outlet for allowing the fluid with less suspended and dissolved materials to exit system.

21. The system of claim 20 wherein the structure which provides for a controlled atmosphere in the system comprises:

a) adjustable louvers which are located on the structure to allow for air exchange, circulation, and maintenance access;
b) fans which are ducted onto the structure to allow for the movement of the atmosphere into or out of the structure for purposes of air ventilation, treatment, or scrubbing;
c) a device which is connected to the fans which treats or scrubs substances from the controlled atmosphere.

22. The system of claim 20 whereby the discharge outlet is connectable to a polishing pond or ponds.

23. The system of claim 20 whereby the outlet from the polishing pond is connectable to a water treatment plant.

24. The system of claim 20 further comprising one or more structures to produce or conserve energy selected from the group consisting of:

a) waterwheels occurring at a treatment inlet of the system, along any treatment bed, and/or at any fluid outlet connected or connectable to a generator for producing electricity; and
b) structure to trap heat energy released from the fluid so as to warm or cool the system or be collected and conveyed to other facilities.

25. The system of claim 20 whereby magnetic devices are incorporated below the surface of the treatment beds and consist of the classes of permanent and electro-magnets and which extend partially or fully under the treatment beds.

* * * * *